US011175705B1

(12) United States Patent
 Hsu et al.

(10) Patent No.: US 11,175,705 B1
(45) Date of Patent: Nov. 16, 2021

(54) NOTEBOOK COMPUTER

(71) Applicant: Quanta Computer Inc., Taoyuan (TW)

(72) Inventors: Chia-Jung Hsu, Taoyuan (TW); Shen-Pu Hsieh, Taoyuan (TW)

(73) Assignee: Quanta Computer Inc., Taoyuan (TW)

( * ) Notice: Subject to any disclaimer, the term of this patent is extended or adjusted under 35 U.S.C. 154(b) by 0 days.

(21) Appl. No.: 17/027,900

(22) Filed: Sep. 22, 2020

(30) Foreign Application Priority Data

May 12, 2020 (TW) .................................. 109115773

(51) Int. Cl.
 *G06F 1/16* (2006.01)
(52) U.S. Cl.
 CPC .......... *G06F 1/1681* (2013.01); *G06F 1/1624* (2013.01); *G06F 1/1632* (2013.01)
(58) Field of Classification Search
 CPC ..... G06F 1/1681; G06F 1/1632; G06F 1/1624
 See application file for complete search history.

(56) References Cited

U.S. PATENT DOCUMENTS

| | | | | |
|---|---|---|---|---|
| 2019/0129476 A1* | 5/2019 | Alva | ...................... | G06F 1/1647 |
| 2020/0080357 A1* | 3/2020 | Lin | ...................... | G06F 1/1616 |
| 2020/0264672 A1* | 8/2020 | Morino | .................. | G06F 1/1624 |
| 2020/0285273 A1* | 9/2020 | Liang | ..................... | G06F 1/1616 |
| 2020/0363839 A1* | 11/2020 | Liu | ........................ | G06F 1/1616 |
| 2021/0011525 A1* | 1/2021 | Lin | ........................ | G06F 1/1616 |
| 2021/0124398 A1* | 4/2021 | Yang | ..................... | G06F 1/1616 |

* cited by examiner

*Primary Examiner* — Rockshana D Chowdhury
(74) *Attorney, Agent, or Firm* — Servilla Whitney LLC (57) ABSTRACT

A notebook computer includes an upper part, a lower part, a delay linkage module, and a hinge portion connected to the lower part and the upper part. The delay linkage module includes a delay linking rod, a linkage member, a guide rod and a connecting shaft. The linkage member is fixedly connected to the hinge portion, and pivotally connected to the delay linking rod. The guide rod is pivotally connected to a second display screen and a fixing base of the lower part. The connecting shaft is connected to the guide rod, and slidably located in an elongated through hole of the delay linking rod. when a first display screen of the upper part is rotated away from the lower part, the hinge portion pulls the delay linkage module to rotate the second display screen being lifted up from the lower part.

10 Claims, 10 Drawing Sheets

NOTEBOOK COMPUTER

CROSS-REFERENCE TO RELATED APPLICATION

This application claims priority to Taiwan Application Serial Number 109115773, filed on May 12, 2020, which is herein incorporated by reference.

BACKGROUND

Technical Field

The present disclosure relates to a computer. More particularly, the present disclosure relates to a notebook computer.

Description of Related Art

In order to meet the demands of the numerous users, many manufacturers have modified the design of an ordinary notebook computer into one with primary and secondary screens in order to increase the display effect. However, the above design limits the original scope of the heat dissipation holes formed in the notebook computer.

Therefore, how to provide a solution of increasing the display effect mentioned above and avoiding adverse effects caused by poor heat dissipation has become a key research by related manufacturers.

SUMMARY

One aspect of the present disclosure is to provide a notebook computer to solve the aforementioned problems of the prior art.

In one embodiment of the disclosure, the notebook computer includes an upper part, a lower part, a hinge portion and a delay linkage module. The upper part is provided with a first display screen. The lower part is provided with a casing, a fixing base disposed on the casing, and a second display screen liftably disposed on one surface of the casing. The hinge portion is pivotally connected to the fixing base, and fixedly connected to the upper part. The delay linkage module includes a delay linking rod, a linkage member, a guide rod and a connecting shaft. The delay linking rod is formed with an elongated through hole having a first end and a second end which are opposite to each other. The linkage member is fixedly connected to the hinge portion, and pivotally connected to the delay linking rod. The guide rod is pivotally connected to the second display screen and the fixing base. The connecting shaft is connected to the guide rod, and slidably located within the elongated through hole. When the upper part is rotated relative to the lower part so as to move the first display screen away from the one surface of the casing, the hinge portion pulls the delay linking rod through the linkage member, until the connecting shaft is moved to the second end from the first end of the elongated through hole, the delay linking rod starts to drive the guide rod to rotate the second display screen, so that the second display screen is lifted up from the casing.

According to one or more embodiments of the disclosure, in the foregoing notebook computer, the casing is formed with a sunken portion, and the second display screen is liftably disposed in the sunken portion. When the delay linking rod lifts the second display screen from the casing, the second display screen is in contact with the first display screen and the sunken portion, respectively.

According to one or more embodiments of the disclosure, in the foregoing notebook computer, one side of the second display screen opposite to the first display screen is disposed in the sunken portion, and a gap is defined between the casing and one side of the second display screen being adjacent to the first display screen.

According to one or more embodiments of the disclosure, in the foregoing notebook computer, the casing is formed with an inner space, and a bottom portion of the sunken portion is formed with a plurality of ventilation holes being in communication with the inner space. When the upper part and the lower part are stacked with each other, the second display screen covers the ventilation holes within the sunken portion.

According to one or more embodiments of the disclosure, in the foregoing notebook computer, the fixing base is provided with a pivoting portion, a first shaft receiving recess and a second shaft receiving recess. The first shaft receiving recess is deeper than the second shaft receiving recess, and the pivoting portion is located between the first shaft receiving recess and the second shaft receiving recess, and pivotally connected to the guide rod through a pivoting shaft. When the first display screen is faced towards the surface of the casing, the connecting shaft is located between the first shaft receiving recess and the first end of the elongated through hole. When the delay linking rod lifts the second display screen from the casing, the connecting shaft is located between the second shaft receiving recess and the second end of the elongated through hole.

According to one or more embodiments of the disclosure, in the foregoing notebook computer, the pivoting portion is formed with a guiding arc surface. The guiding arc surface is respectively connected to the first shaft receiving recess and the second shaft receiving recess so as to allow the connecting shaft to be reciprocatedly moved between the first shaft receiving recess and the second shaft receiving recess along the guiding arc surface.

According to one or more embodiments of the disclosure, in the foregoing notebook computer, the fixing base is provided with a securing portion and a depressed area located between the securing portion and the pivoting portion. When the upper part and the lower part are stacked with each other, the delay linking rod and the linkage member are received within the depressed area totally.

According to one or more embodiments of the disclosure, in the foregoing notebook computer, the hinge portion includes a fixing frame and a rotation shaft. The fixing frame is fixedly connected to the upper part. The rotation shaft is pivotally connected to the fixing frame. One end of the rotation shaft is connected to the fixing frame, the other end of the rotation shaft is connected to the linkage member.

According to one or more embodiments of the disclosure, in the foregoing notebook computer, one side of the fixing base is formed with an accommodating groove, the lower part is provided with at least one friction damper, the friction damper is fixed in the accommodating groove, and the rotating shaft is pivotally passed through the one side of the fixing base and the friction damper.

According to one or more embodiments of the disclosure, in the foregoing notebook computer, when the connecting shaft is moved to the second end from the first end of the elongated through hole, the upper part rotates at a rotation angle relative to the casing, and the rotation angle is 30°-40°.

Thus, through the structure of the above embodiments, the present disclosure can not only relatively lift the second display screen to the first display screen to increase better display effect and heat dissipation performance, but also reduce the chance of interference between the second display screen and the first display screen when the upper part is relatively rotated away from the lower part.

The above description is merely used for illustrating the problems to be resolved, the technical methods for resolving the problems and their efficacies, etc. The specific details of the present disclosure will be explained in the embodiments below and related drawings.

BRIEF DESCRIPTION OF THE DRAWINGS

The accompanying drawings are included to provide a further understanding of the present disclosure, and are incorporated in and constitute a part of this specification. The drawings illustrate embodiments of the disclosure and, together with the description, serve to explain the principles of the disclosure. In the drawings.

DETAILED DESCRIPTION

Reference will now be made in detail to the present embodiments of the present disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the disclosure without departing from the scope or spirit of the disclosure.

Figure 1:
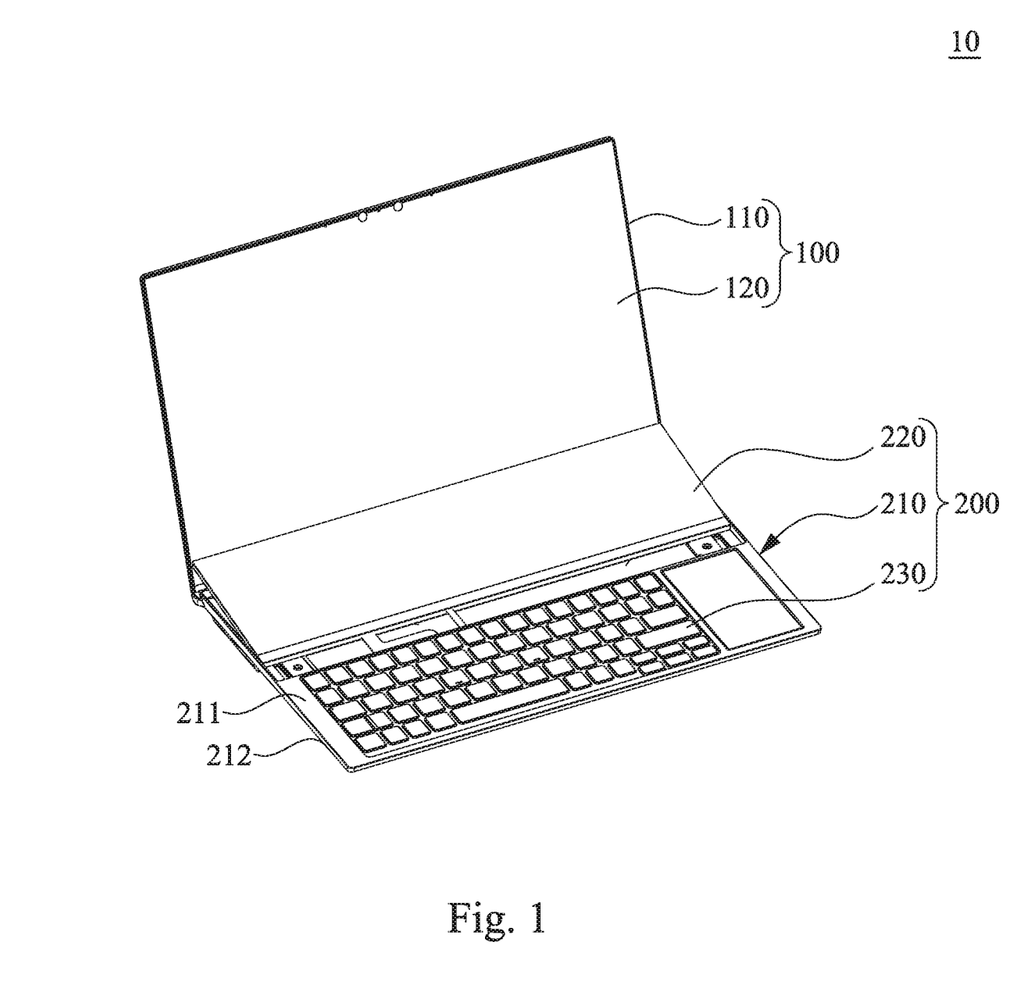
FIG. 1 is a three dimensional view of a notebook computer in an open state according to one embodiment of the present disclosure.
Figure 2:
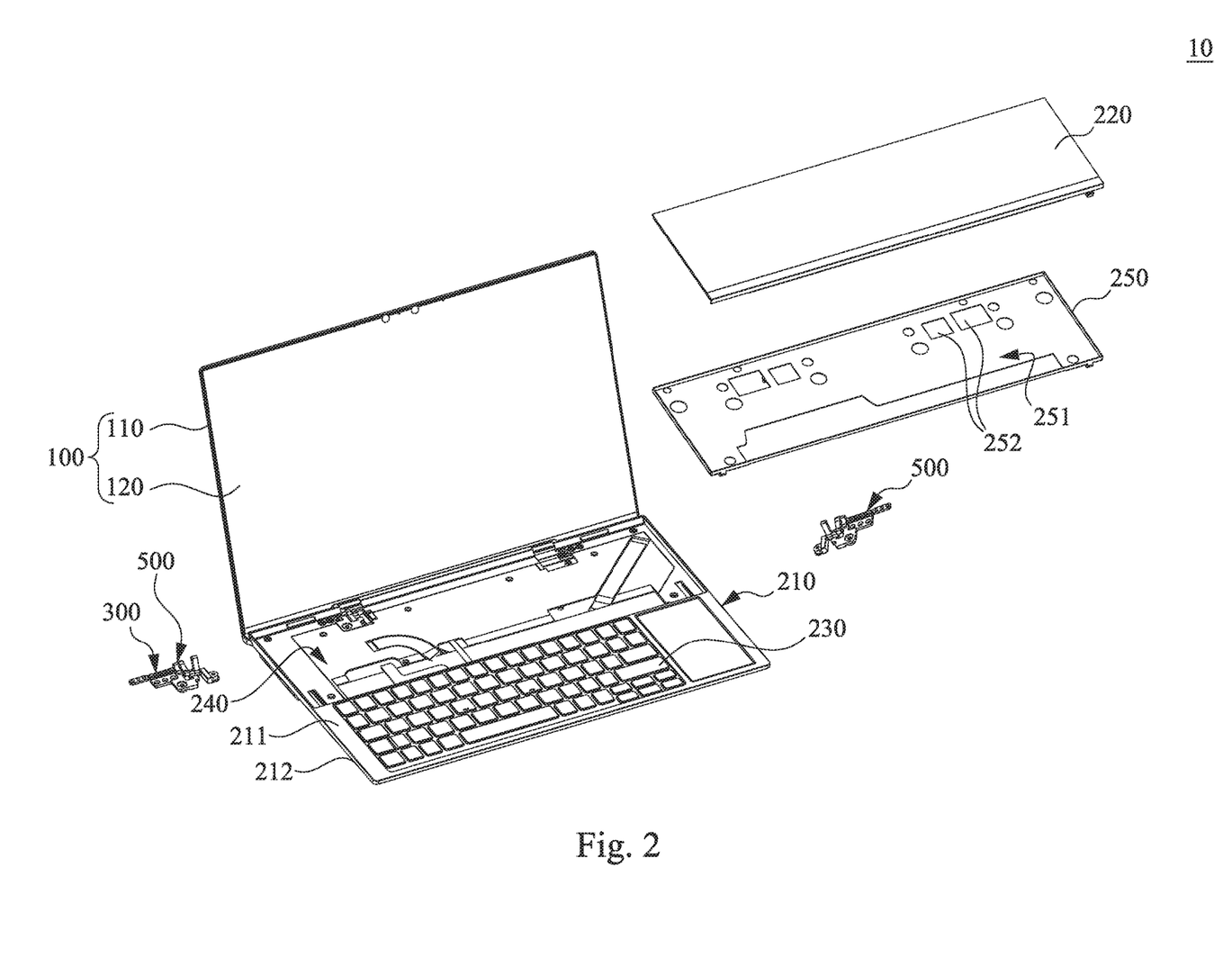
FIG. 2 is a partial exploded view of the notebook computer in FIG. 1.
Figure 3:
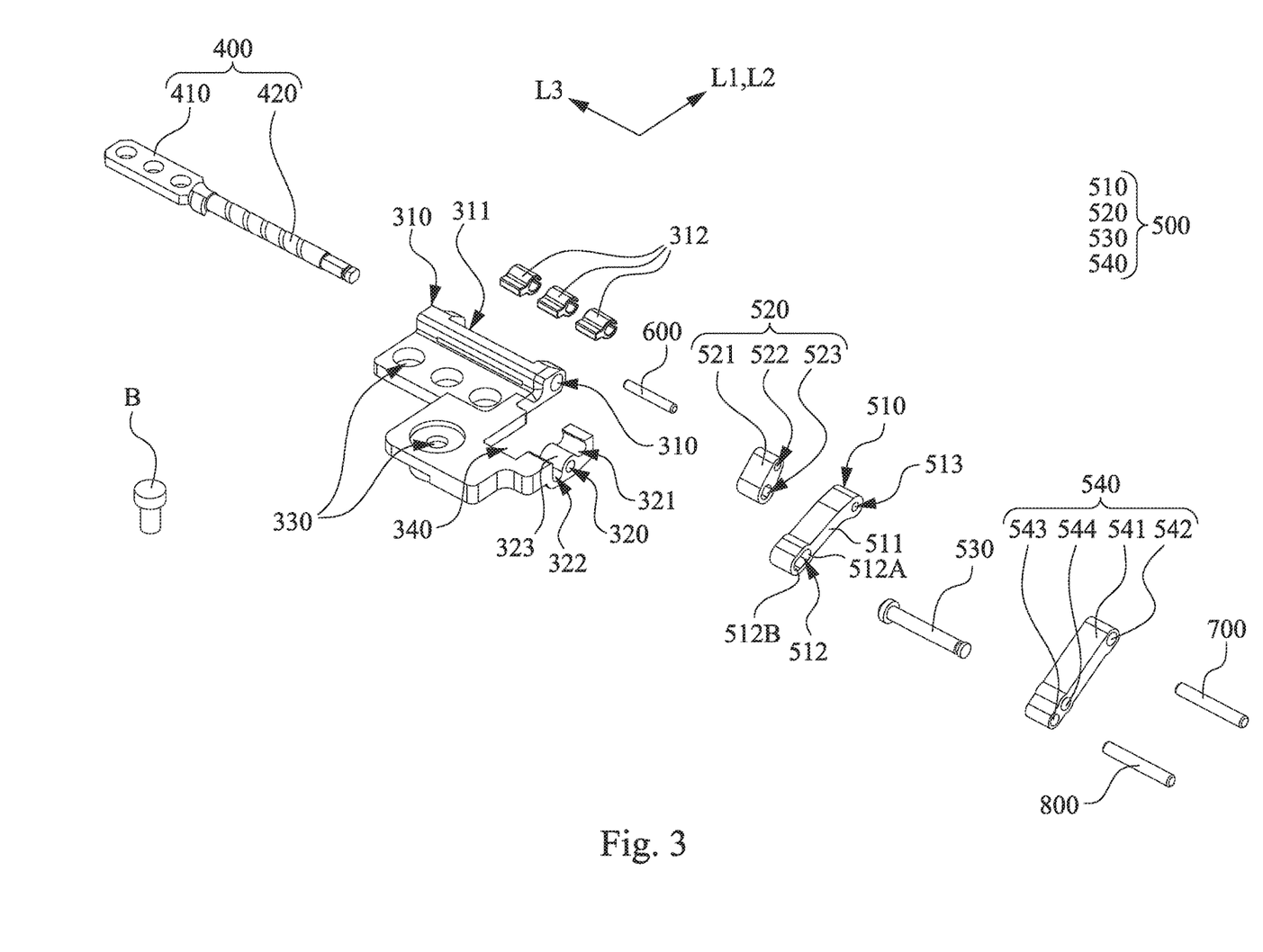
FIG. 3 is an exploded view of an area M in FIG. 2.

Reference is now made to FIG. 1 to FIG. 3 in which FIG. 1 is a three dimensional view of a notebook computer 10 in an open state according to one embodiment of the present disclosure, FIG. 2 is a partial exploded view of the notebook computer in FIG. 1, and FIG. 3 is an exploded view of an area M in FIG. 2. As shown in FIG. 1 to FIG. 3, in one embodiment, the notebook computer 10 includes an upper part 100, a lower part 200, a hinge portion 400 and two delay linkage modules 500. The upper part 100 is provided with a first casing 110 and a first display screen 120. The first display screen 120 is disposed on one surface of the first casing 110. The lower part 200 is provided with a second casing 210, a fixing base 300, a second display screen 220 and a keyboard 230. The second casing 210 is provided with a top surface 211 and a bottom surface 212 which are opposite to each other. The notebook computer 10 can be placed on a loading surface (e.g., table top) with the bottom surface 212 of the second casing 210. The second display screen 220 and the keyboard 230 are exposed outwards from the top surface 211 of the second casing 210. The second display screen 220 is disposed between the keyboard 230 and the second casing 210, and the second display screen 220 is liftably disposed within the second casing 210. The fixing base 300 is disposed in the second casing 210. The hinge portion 400 is pivotally connected to the upper part 100 and the lower part 200 so that the upper part 100 is rotatably connected to the lower part 200. More particularly, one end of the hinge portion 400 is pivotally connected to one side the fixing base 300, and the other end of the hinge portion 400 is fixedly connected to the first casing 110 so as to rotate the upper part 100 relative to the lower part 200. In this embodiment, the area of the second display screen 220 is smaller than the area of the first display screen 120, however, the disclosure is not limited thereto.

The delay linkage modules 500 are relatively disposed on the lower part 200. Each of the delay linkage modules 500 includes a delay linking rod 510, a linkage member 520, a guide rod 540 and a connecting shaft 530. The delay linking rod 510 is formed with an elongated through hole 512, and one long axis direction L1 of the elongated through hole 512 is parallel to one long axis direction L1 of the delay linking rod 510. The linkage member 520 is fixedly connected to the hinge portion 400, and pivotally connected to the delay linking rod 510. The guide rod 540 is pivotally connected to the second display screen 220 and the fixing base 300 respectively. The connecting shaft 530 is connected to the guide rod 540, and slidably located within the elongated through hole 512.

Specifically, the fixing base 300 is provided with a first pivoting portion 310, a second pivoting portion 320 and a plurality of securing portions 330. The securing portions 330 are distributed on the fixing base 300, and are fixed to the second casing 210 through bolts B respectively. The first pivoting portion 310 is disposed on one side of the fixing base 300, and the second pivoting portion 320 is disposed on another side of the fixing base 300. The first pivoting portion 310 includes an accommodating groove 311. The accommodating groove 311 is provided with a plurality of friction dampers 312 therein. The friction dampers 312 are fixed in a single row in the accommodating groove 311. The hinge portion 400 is pivotally passed through the first pivoting portion 310 and the friction dampers 312. The friction dampers 312 are used to slow the rotation speed of the upper part 100 relative to the lower part 200.

The hinge portion 400 includes a fixing frame 410 and a rotation shaft 420. The fixing frame 410 is fixedly connected to the first casing 110 of the upper part 100. The rotation shaft 420 is pivotally connected to the first pivoting portion 310 of the fixing base 300. One end of the rotation shaft 420 is connected to the fixing frame 410, the other end of the rotation shaft 420 is connected to the linkage member 520. Thus, the linkage member 520 is rotatable synchronously with the rotation shaft 420.

The linkage member 520 includes an elongated crank 521, a first shaft hole 522 and a second shaft hole 523. A long axis direction L2 of the elongated crank 521 is perpendicular to one long axis direction L3 of the rotation shaft 420. The first shaft hole 522 and the second shaft hole 523 are oppositely formed on the elongated crank 521. The other end of the rotation shaft 420 is fixed within the first shaft hole 522 of the linkage member 520.

The delay linking rod 510 further includes a long rod body 511 and a shaft groove 513. The shaft groove 513 and the elongated through hole 512 are oppositely formed on the long rod body 511.

The elongated through hole 512 includes a first end 512A and a second end 512B opposite to each other, and the first end 512A is located between the second end 512B and the shaft groove 513. The shaft groove 513 of the delay linking rod 510 and the second shaft hole 523 of the linkage member 520 are pivotally connected to each other through a first pivoting shaft 600.

The guide rod 540 includes a long shaft 541, a third shaft hole 542, a fourth shaft hole 543, and a fifth shaft hole 544. The third shaft hole 542 and the fourth shaft hole 543 are oppositely formed on the long shaft 541, and the fifth shaft hole 544 is formed between the third shaft hole 542 and the fourth shaft hole 543. The third shaft hole 542 of the guide rod 540 and the shaft receiving portion 221 of the second display screen 220 are pivotally connected to each other through a second pivoting shaft 700. The fourth shaft hole 543 of the guide rod 540 and the second pivoting portion 320 of the fixing base 300 are pivotally connected to each other through a third pivoting shaft 800 so that the guide rod 540 is rotatable relative to the fixing base 300 about the third pivoting shaft 800. One end of the connecting shaft 530 is located in the fifth shaft hole 544 of the guide rod 540, and the other end is slidably located in the elongated through hole 512. Therefore, the connecting shaft 530 is able to move the guide rod 540 to rotate together.

Figure 4A:
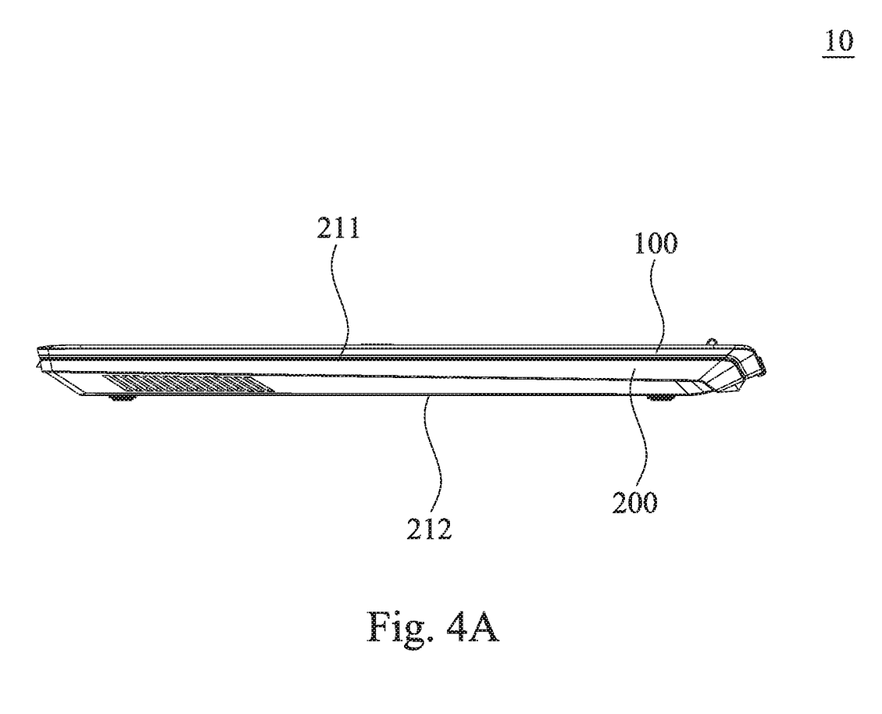
FIG. 4A to FIG. 4C are continual operation views of a notebook computer of FIG. 1 from a closed state to the open state according to one embodiment of the present disclosure.
Figure 4B:
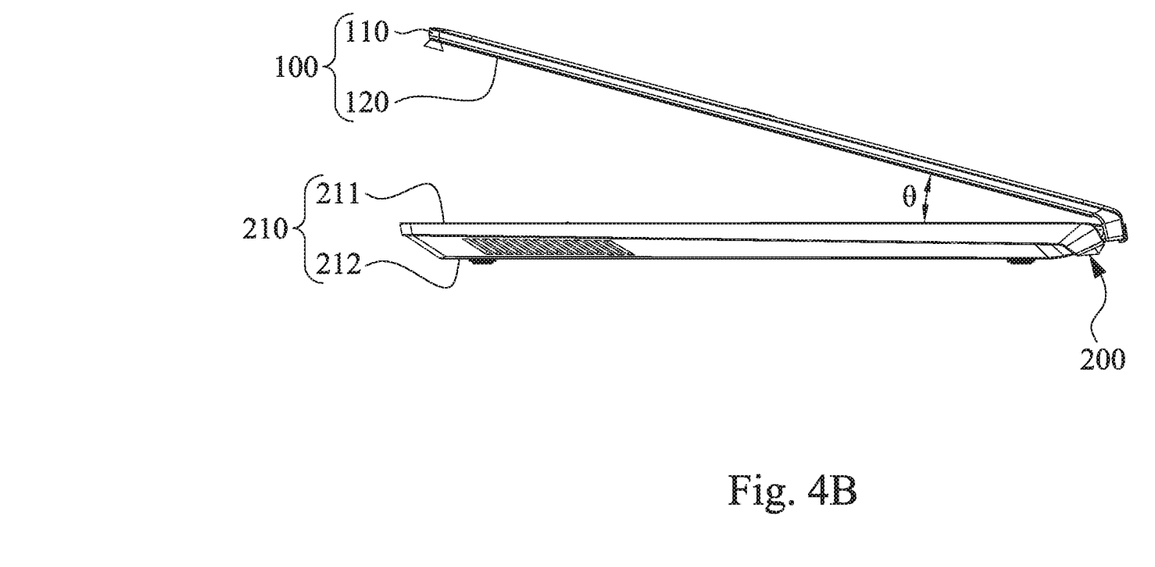
Figure 4C:
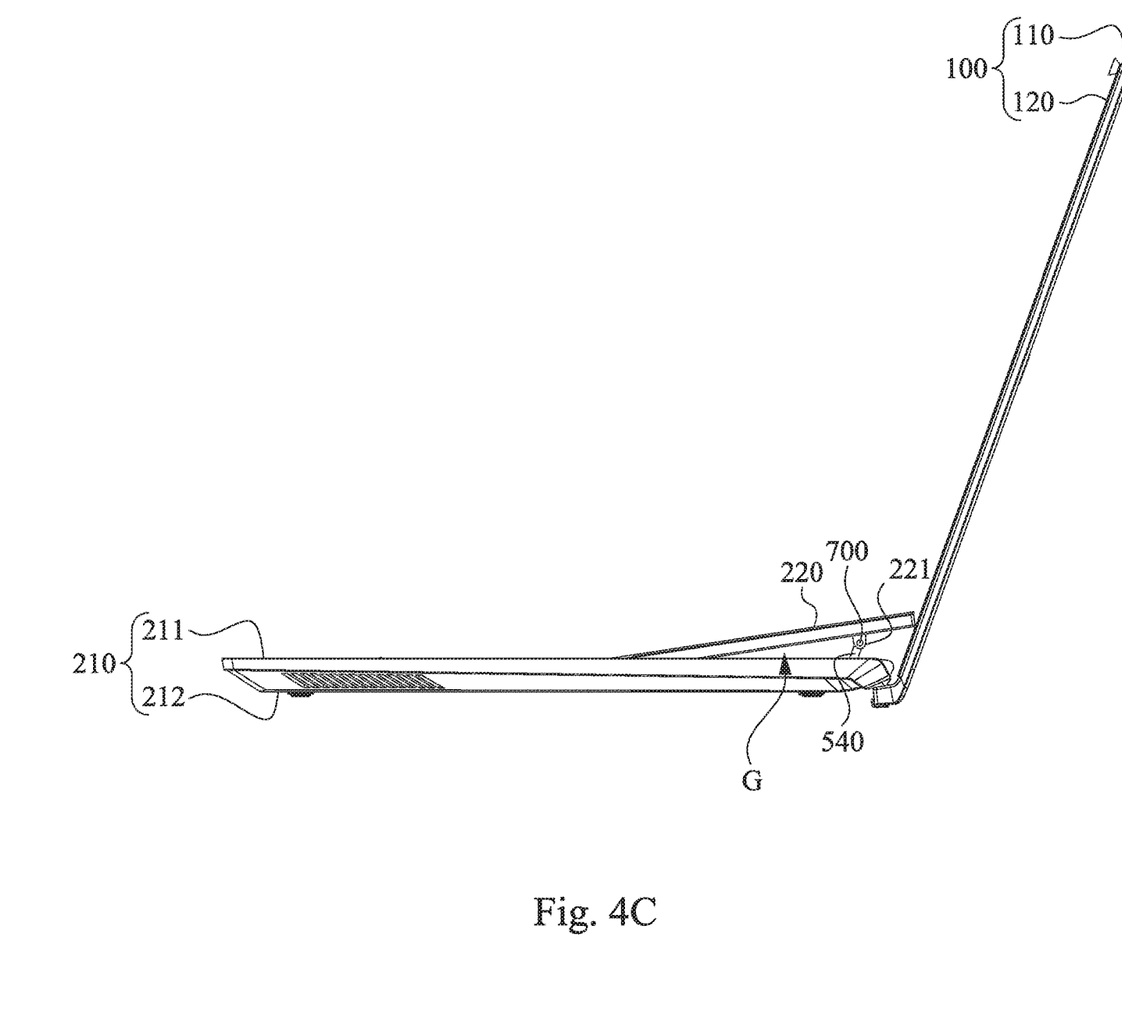

FIG. 4A to FIG. 4C are continual operation views of a notebook computer 10 of FIG. 1 from a closed state to the open state according to one embodiment of the present disclosure. As shown in FIG. 4A, when a user rotates the upper part 100 relative to the lower part 200 so that the upper part 100 is stacked on the lower part 200, the first display screen 120 directly faces the top surface 211 of the second casing 210 (refer to FIG. 1), at this time, the notebook computer 10 is in the closed state. Conversely, as shown in FIG. 4B and FIG. 4C, when the user rotates the upper part 100 relative to the lower part 200, so as to increase an included angle between the upper part 100 and the lower part 200, that is, rotate the first display screen 120 to be properly positioned from the top surface 211 of the second casing 210, at this time, the notebook computer 10 is in the open state.

It is noted, when the notebook computer 10 is in the closed state, the connecting shaft 530 is located at the first end 512A of the elongated through hole.

Figure 5A:
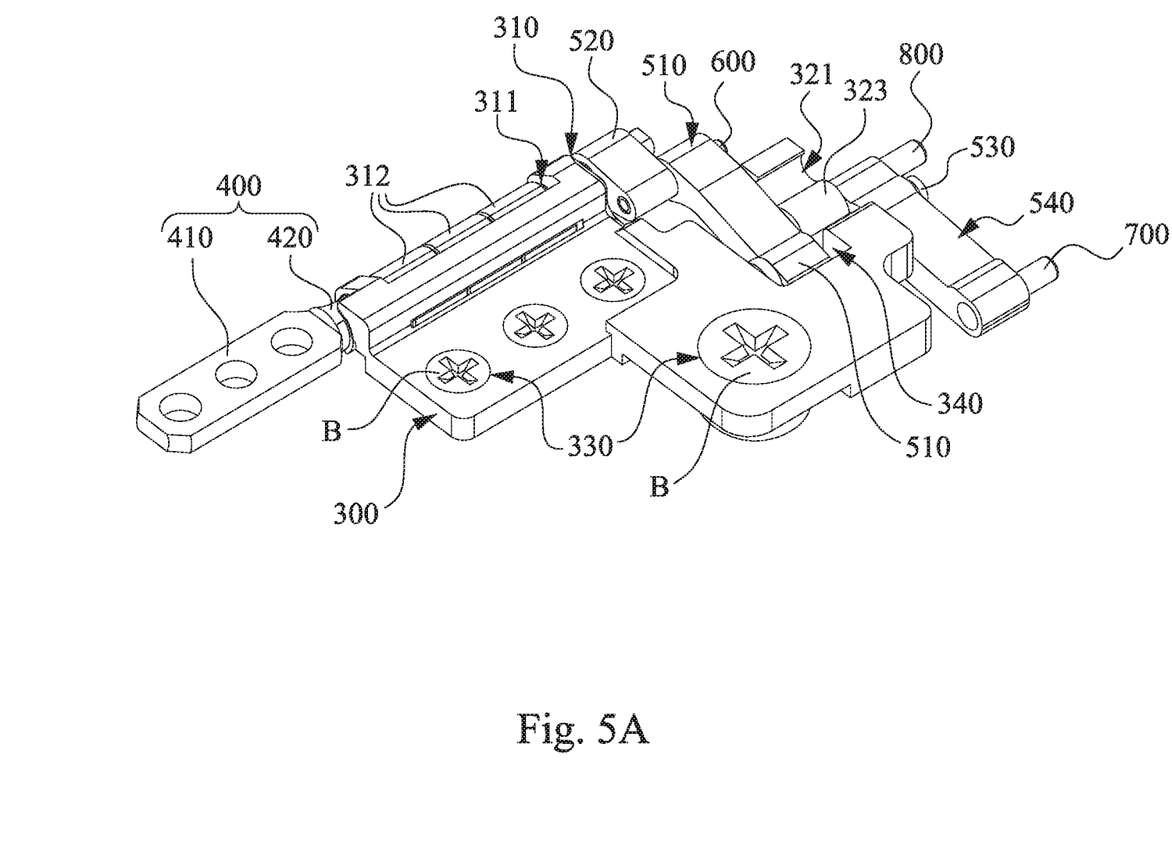
FIG. 5A to FIG. 5D are corresponding operation views of a delay linkage module and a hinge portion in FIG. 4A to FIG. 4C.
Figure 5B:
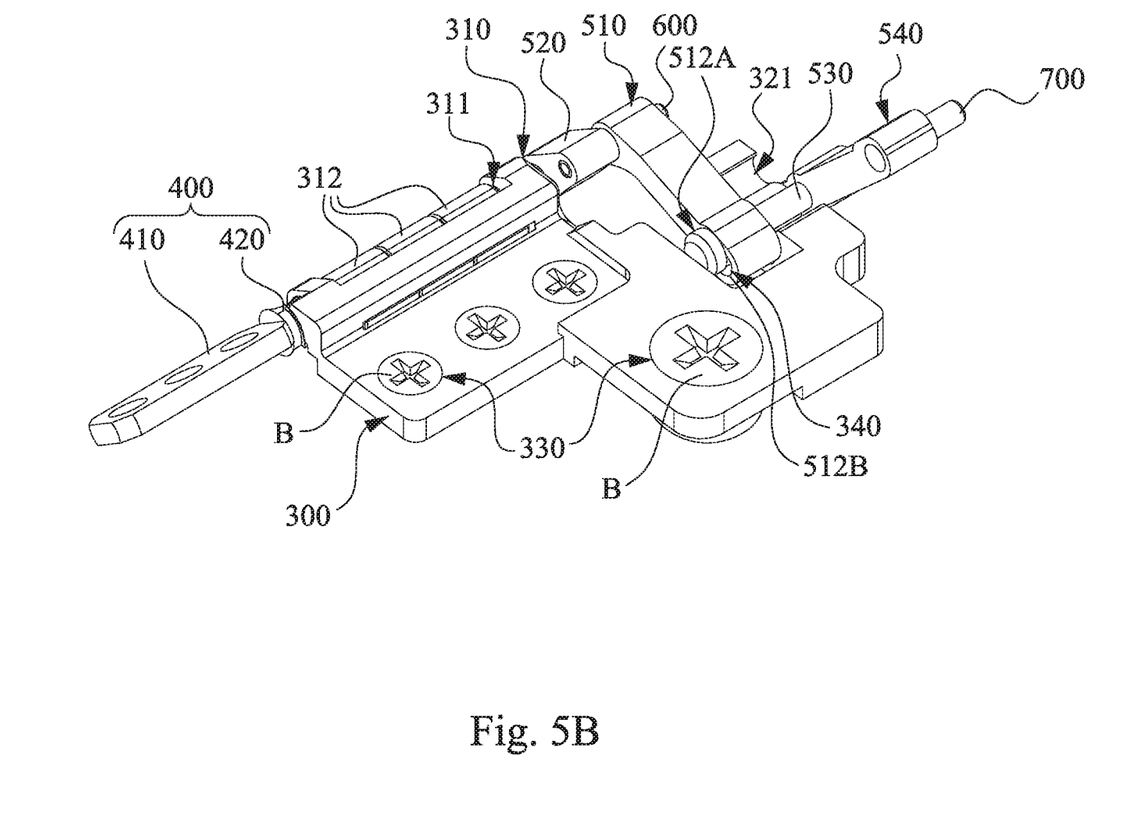

FIG. 5A to FIG. 5D are corresponding operation views of a delay linkage module 500 and a hinge portion 400 in FIG. 4A to FIG. 4C. As shown in FIG. 4A and FIG. 5A, when a user rotates the upper part 100 of the notebook computer 10 so as to be into the open state (FIG. 4A), the upper part 100 rotates the linkage member 520 through the hinge portion 400 (FIG. 5A and FIG. 5B) so that the linkage member 520 pulls to rotate the delay linking rod 510 through the first pivoting shaft 600. Next, the connecting shaft 530 located in the elongated through hole 512 starts to move to the second end 512B (FIG. 5B and FIG. 5C) from the first end 512A of the elongated through hole 512. Until the connecting shaft 530 is moved to the second end 512B from the first end 512A of the elongated through hole 512, the delay linking rod 510 is able to drive the guide rod 540 to rotate through the connecting shaft 530 so as to slightly lift the second display screen 220 on the second casing 210 by the guide rod 540.

Figure 5C:
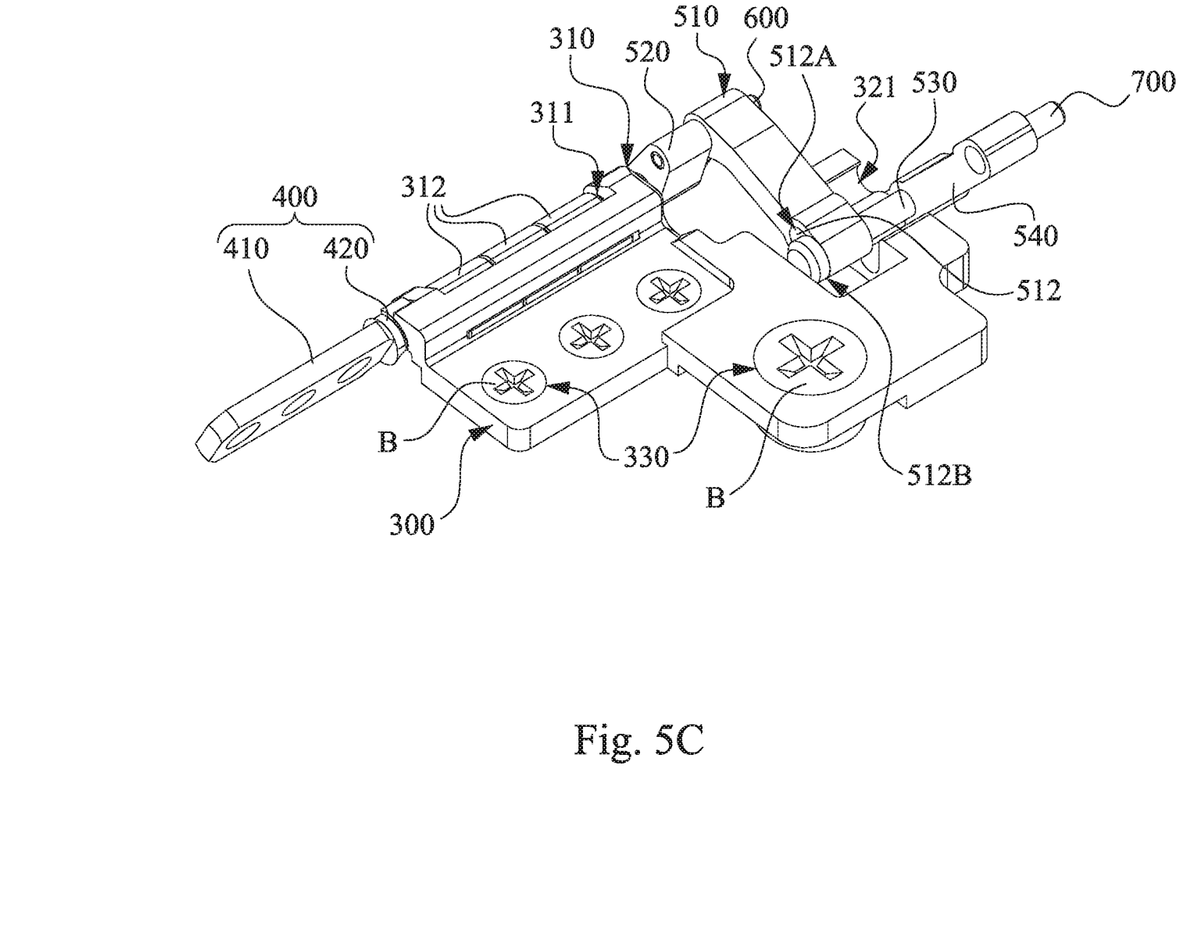
Figure 5D:
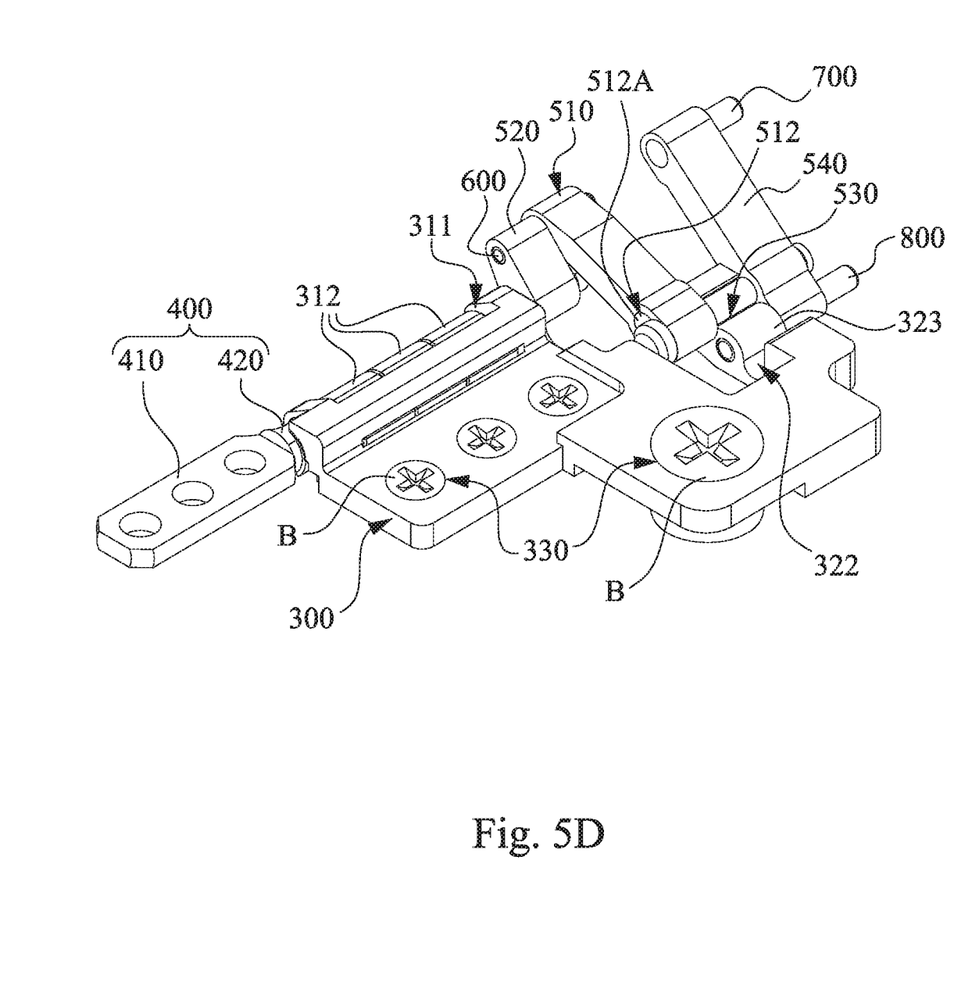

It is noted, as shown in FIG. 4B and FIG. 5C, when the user rotates the upper part 100 on the notebook computer 10 at beginning, so that the connecting shaft 530 located in the elongated through hole 512 moves to the second end 512B (FIG. 5B and FIG. 5C) from the first end 512A of the elongated through hole 512. Since the connecting shaft 530 still slides within the elongated through hole 512, the guide rod 540 can be rotated to lift the second display screen 220 upward only after a time difference, thus, the second display screen 220 will not be moved along with the connecting shaft 530 simultaneously. Therefore, the second display screen 220 will not hit the first display screen 120.

When the connecting shaft 530 moves from the first end 512A of the elongated through hole 512 to the second end 512B, the upper part 100 rotates by a rotation angle θ in advance, which means that the length of the elongated through hole 512 depends on the rotation angle θ of the upper part 100 beforehand. For example, when the upper part 100 rotates by a rotation angle θ about 30-40° in advance, the second display screen 220 starts to rise upward. However, the disclosure is not limited thereto. Those in the field of the disclosure can adjust the length of the elongated through hole 512 according to requirements or restrictions to determine the rotation angle θ of the upper part 100 in advance.

Furthermore, in the embodiment, the fixing base 300 further includes a depressed area 340, a first shaft receiving recess 321 and a second shaft receiving recess 322. The depressed area 340 is located between the securing portions 330 and the second pivoting portion 320. The second pivoting portion 320 is located between the first shaft receiving recess 321 and the second shaft receiving recess 322. The first shaft receiving recess 321 is deeper than the second shaft receiving recess 322. Thus, when the upper part 100 is rotated to stack on the lower part 200 so that the first display screen 120 directly faces the top surface 211 of the second casing 210, the connecting shaft 530 in the elongated through hole 512 is moved to the first end 512A thereof from the second end 512B, so as to be put into the first shaft receiving recess 321, at this time, the delay linking rod 510 and the linkage member 520 are received within the depressed area 340 totally. On the contrary, when the delay linking rod 510 lifts the second display screen 220 upwards from the second casing 210, the connecting shaft 530 in the elongated through hole 512 is moved to the second end 512B thereof from the first end 512A, so as to be put into the second shaft receiving recess 322.

Specifically, the second pivoting portion 320 is formed with a guiding arc surface 323. The guiding arc surface 323 is respectively connected to the first shaft receiving recess 321 and the second shaft receiving recess 322 so as to allow the connecting shaft 530 to be reciprocatedly moved into the first shaft receiving recess 321 or the second shaft receiving recess 322 along the guiding arc surface 323.

In the embodiment, the second casing 210 is provided with an inner space 240 and a loading rack 250. The loading rack 250 is concavely formed on the top surface 211 of the second casing 210, and arranged between the keyboard 230 and the first display screen 120. The loading rack 250 is formed with a sunken portion 251 and a plurality of ventilation holes 252, and the second display screen 220 is liftably disposed within the sunken portion 251. The inner space 240 is disposed in the second casing 210 between the loading rack 250 and the bottom surface 212 of the second casing 210 for receiving the delay linkage modules 500. The ventilation holes 252 are formed on the bottom of the sunken portion 251, and in communication with the inner space 240, respectively.

Thus, as shown in the FIG. 1 and FIG. 4C, when the notebook computer 10 is in the closed state, the second display screen 220 is filled to be embedded in the sunken portion 251 to cover the bottom of the sunken portion 251 and the ventilation holes 252, and is able to directly face the first display screen 120 of the first component. Conversely, when the notebook computer 10 in the open state lifts the second display screen 220 on the second casing 210 by the guide rod 540, the second display screen 220 is in contact with the first display screen 120 and the sunken portion 251. More specifically, one side of the second display screen 220 opposite to the first display screen 120 is disposed in the sunken portion 251, and a gap G is defined between the second casing 210 and one side of the second display screen 220 being adjacent to the first display screen 120.

Thus, through the structure of the above embodiments, the disclosure can not only relatively lift the second display screen to the first display screen to increase better display effect and heat dissipation performance, but also reduce the chance of interference between the second display screen and the first display screen when the upper part is relatively rotated away from the lower part.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A notebook computer, comprising:
   an upper part having a first display screen;
   a lower part having a casing, a fixing base disposed on the casing, and a second display screen liftably disposed on one surface of the casing;
   a hinge portion pivotally connected to the fixing base, and fixedly connected to the upper part; and
   a delay linkage module comprising:
      a delay linking rod formed with an elongated through hole having a first end and a second end which are opposite to each other;
      a linkage member fixedly connected to the hinge portion, and pivotally connected to the delay linking rod;
      a guide rod pivotally connected to the second display screen and the fixing base; and
      a connecting shaft connected to the guide rod, and slidably located within the elongated through hole,
   wherein when the upper part is rotated relative to the lower part so as to move the first display screen away from the one surface of the casing, the hinge portion pulls the delay linking rod through the linkage member, until the connecting shaft is moved to the second end from the first end of the elongated through hole, the delay linking rod starts to drive the guide rod to rotate the second display screen, so that the second display screen is lifted upward from the casing.

2. The notebook computer of claim 1, wherein the casing is formed with a sunken portion, and the second display screen is liftably disposed in the sunken portion,
   wherein when the delay linking rod lifts the second display screen from the casing, the second display screen is in contact with the first display screen and the sunken portion, respectively.

3. The notebook computer of claim 2, wherein one side of the second display screen opposite to the first display screen is disposed in the sunken portion, and a gap is defined between the casing and one side of the second display screen being adjacent to the first display screen.

4. The notebook computer of claim 2, wherein the casing is formed with an inner space, and a bottom portion of the sunken portion is formed with a plurality of ventilation holes being in communication with the inner space,
   wherein when the upper part and the lower part are stacked with each other, the second display screen covers the ventilation holes within the sunken portion.

5. The notebook computer of claim 2, wherein the fixing base is provided with a pivoting portion, a first shaft receiving recess and a second shaft receiving recess, the first shaft receiving recess is deeper than the second shaft receiving recess, and the pivoting portion is located between the first shaft receiving recess and the second shaft receiving recess, and pivotally connected to the guide rod through a pivoting shaft,
   wherein when the first display screen is faced towards the surface of the casing, the connecting shaft is located at the first shaft receiving recess and in the first end of the elongated through hole,
   when the delay linking rod lifts the second display screen from the casing, the connecting shaft is located at the second shaft receiving recess and in the second end of the elongated through hole.

6. The notebook computer of claim 5, wherein the pivoting portion is formed with a guiding arc surface, the guiding arc surface is respectively connected to the first shaft receiving recess and the second shaft receiving recess so as to allow the connecting shaft to be reciprocatedly moved between the first shaft receiving recess and the second shaft receiving recess along the guiding arc surface.

7. The notebook computer of claim 5, wherein the fixing base is provided with a securing portion and a depressed area located between the securing portion and the pivoting portion,
   wherein when the upper part and the lower part are stacked with each other, the delay linking rod and the linkage member are received within the depressed area totally.

8. The notebook computer of claim 1, wherein the hinge portion comprises:
   a fixing frame fixedly connected to the upper part; and
   a rotation shaft pivotally connected to the fixing frame, and one end of the rotation shaft is connected to the fixing frame, the other end of the rotation shaft is connected to the linkage member.

9. The notebook computer of claim 8, wherein one side of the fixing base is formed with an accommodating groove, the lower part is provided with at least one friction damper, the friction damper is fixed in the accommodating groove, and the rotating shaft is pivotally passed through the one side of the fixing base and the friction damper.

10. The notebook computer of claim 1, wherein when the connecting shaft is moved to the second end from the first end of the elongated through hole, the upper part rotates at a rotation angle relative to the casing, and the rotation angle is 30°-40°.

* * * * *